（12） United States Patent
Katsumata et al.

(10) Patent No.: US 6,887,734 B2
(45) Date of Patent: May 3, 2005

(54) METHOD OF MANUFACTURING SEMICONDUCTOR PRESSURE SENSOR

(75) Inventors: Takashi Katsumata, Kariya (JP); Inao Toyoda, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/791,762

(22) Filed: Mar. 4, 2004

(65) Prior Publication Data

US 2004/0180467 A1 Sep. 16, 2004

(30) Foreign Application Priority Data

Mar. 13, 2003 (JP) ........................................ 2003-067958

(51) Int. Cl.⁷ ............................................. H01L 21/00
(52) U.S. Cl. ........................... 438/50; 438/53; 438/973
(58) Field of Search .............................. 438/48–53, 750, 438/973

(56) References Cited

U.S. PATENT DOCUMENTS 6,595,065 B2    7/2003 Tanizawa et al.
6,601,452 B2    8/2003 Murata et al.

FOREIGN PATENT DOCUMENTS

JP    A-H01-261872    10/1989
JP    A-H09-18016     1/1997

*Primary Examiner*—H. Jey Tsai
(74) *Attorney, Agent, or Firm*—Posz Law Group, PLC

(57) ABSTRACT

In a semiconductor pressure sensor manufacturing method of disposing an etching mask (50) at one-face (11) side of a monocrystal silicon substrate 10 in which the face-direction of the one face 11 corresponds to the (110)-face, and then carrying out anisotropic etching to form a recess portion (20) and a diaphragm (30) at the bottom surface side of the recess portion (20), the etching mask (51) is designed to have a cross-shaped opening portion (51) at which a first area extending along the <110> crystal axis direction and a second area extending along the <100> crystal axis direction cross each other, the area of the opening portion (51a) of the overlap area between the first and second areas in the opening portion (51) being set to be smaller than the area of the diaphragm (30).

5 Claims, 6 Drawing Sheets

METHOD OF MANUFACTURING SEMICONDUCTOR PRESSURE SENSOR

CROSS REFERENCE TO RELATED APPLICATION

This application is based upon, claims the benefit of priority of, and incorporates by reference the contents of, Japanese Patent Application No. 2003-67958 filed on Mar. 13, 2003.

FIELD OF THE INVENTION

The present invention relates to a method of manufacturing a diaphragm type semiconductor pressure sensor achieved by forming a pressure detecting diaphragm on a monocrystal silicon substrate in which the face direction of one face corresponds to the (110)-face.

BACKGROUND OF THE INVENTION

This type of semiconductor pressure sensor is equipped with a monocrystal silicon substrate as a semiconductor substrate whose one face corresponds to the (110)-face, and a pressure detecting diaphragm formed on one face of the monocrystal silicon substrate (for example, see JP-A-2001-356061 (page 3, FIG. 1): Patent Document 1).

Such a semiconductor pressure sensor is manufactured as follows. That is, a monocrystal silicon substrate in which the face direction of one face corresponds to the (110)-face is prepared, an etching mask is disposed at the one face side of the monocrystal silicon substrate, anisotropic etching is performed on the monocrystal silicon substrate from the one face thereof to form a recess portion in the monocrystal silicon substrate, and then a diaphragm for receiving pressure is formed at the bottom surface side of the recess portion in the monocrystal silicon substrate.

Here, strain gage resistors constituting a bridge circuit for outputting a detection signal in connection with strain of the diaphragm are formed in the diaphragm. The strain gage resistors are formed by subjecting doping, diffusion or the like to the monocrystal silicon substrate before the anisotropic etching is carried out.

Here, the strain gage resistors comprise a pair of center gages disposed at the center portion of the diaphragm so as to extend along the <110> crystal axis direction, and a pair of side gages disposed to be nearer to the peripheral portion of the diaphragm than the center gages (see JP-A-11-94666 (page 11, FIG. 15): Patent Document 2).

Here, FIG. 4 is a diagram showing the arrangement of strain gage resistors Rc1, Rc2, Rs1, Rs2 on the diaphragm 30 located on the principal surface of the monocrystal silicon substrate 10 of the semiconductor pressure sensor using the monocrystal silicon substrate described above. Two crystal axes <110> and <100> which are mutually orthogonal to each other structurally exist on the (110)-face corresponding to the principal surface of the monocrystal silicon substrate 10.

Here, sensitivity to stress occurring in the <110> crystal axis direction is much larger in piezo-resistance coefficient than sensitivity to stress occurring in the <100> crystal axis direction, so that not the stress occurring in the <100> crystal axis direction, but the stress occurring in the <110> crystal axis direction is used to detect the stress on the (110)-face.

Only one direction of <110> exists on the (110)-face, and thus when higher output is required to be achieved with respect to a crystal axis having higher sensitivity, the strain gage resistors Rc1, Rc2, Rs1, Rs2 must be necessarily arranged as shown in FIG. 4.

That is, the center gages Rc1, Rc2 disposed to be deviated to the center of the diaphragm 30 along the <110> crystal axis direction, and the side gages Rs1, Rs2 disposed to be nearer to the peripheral portion of the diaphragm 30 than the center gages Rc1, Rc2 are provided, and these four strain gage resistors constitute a bridge circuit to detect the stress occurring in the <110> crystal axis direction.

Specifically, the resistance value of the center gage Rc1 is set to RA, the resistance value of the center gage Rc2 is set to RD, the resistance value of the side gage Rs1 is set to RB and the resistance value of the side gage Rs is set to RA, and these strain gage resistors are connected to one another in series to form a rectangular closed circuit, thereby forming a Wheatstone bridge as shown in FIG. 5.

In the bridge circuit 100 shown in FIG. 5, the strain of the diaphragm 30 occurs as the variation of each of the strain gage resistors RA, RB, RC, RD under the state that a DC constant current I is applied from an input terminal Ia to Ib, and a voltage (detection signal) having the level corresponding to a detected output, that is, midpoint potential Vout is output between an output terminals Pa and Pb.

As disclosed in the Patent Document 1, the semiconductor pressure sensor as described above is, not shown, normally designed so that a glass seat is attached to a monocrystal silicon substrate 10 by anode bonding or the like.

Since the monocrystal silicon substrate 10 and the glass seat are different from each other in thermal expansion coefficient, thermal stress occurs between them when the temperature varies, and this thermal stress is transmitted to the strain gage resistors Rc1, Rc2, Rs1, Rs2 on the diaphragm 30. Here, the thermal stress applied to the center gages Rc1, Rc2 and the thermal stress applied to the side gages Rs1, Rs2 are greatly different from each other because of the positional difference therebetween on the diaphragm 30.

As a result, the difference between the thermal stress applied to the side gages Rs1, Rs2 and the thermal stress applied to the center gages Rc1, Rc2 is output as a noise. The difference in thermal difference is dependent on the temperature, varies non-linearly, so that the temperature characteristic of the offset of the output has a curved line with respect to the temperature.

Accordingly, in the temperature characteristic of the offset of the output, a difference occurs between the slope of the offset with respect to the temperature from the room temperature to a high temperature and the slope of the offset with respect to the temperature from a low temperature to the room temperature. This difference is referred to as TNO (Temperature Nonlinearity Offset). TNO is an important characteristic for determining the precision of the sensor.

Furthermore, when miniaturization of the semiconductor pressure sensor, that is, miniaturization of the monocrystal silicon substrate 10 is a primary goal, it may be considered to reduce the diaphragm 30 occupying a large area. However, in this case, the following problems occur.

FIG. 6 is a perspective view showing the shape of the diaphragm 30 of a semiconductor pressure sensor when it is viewed from the one-face 11 side of the monocrystal silicon substrate 10. FIG. 7A is a plan view showing the diaphragm shown in FIG. 6, and FIG. 7B is a cross-sectional view taken along a line VIIB—VIIB of FIG. 7A.

As shown in FIGS. 6 and 7A–7B, a recess portion 20 having an opening portion formed in an octagonal shape is formed in the one-face 11 of the monocrystal silicon substrate 10, and an octagonal diaphragm 30 is formed on the bottom surface of the recess portion 20.

Here, the octagonal opening portion of the recess portion 20 is inherited from the shape of the opening portion of the etching mask. In the recess portion 20, four slant faces 21, 22, 23, 24 and vertical faces located between the respective neighboring slant faces are formed as side surfaces from the octagonal opening portion, and the bottom surface of the recess portion 20 is constructed as the octagonal diaphragm 30 through these side surfaces.

Here, a pair of slant faces 21, 22 confronted to each other along the <100> crystal axis correspond to the (111)-face, and a pair of slant faces 23, 24 confronted to each other along the <110> crystal axis correspond to the (110)-face.

The recess portion 20 as described above can be formed by forming the etching mask having the opening portion corresponding to the octagonal opening portion of the recess portion 20, of silicon nitride film on the one-face 11 of the monocrystal silicon substrate 10 with the CVD (Chemical Vapor Deposition) method or the like, and then conducting anisotropic etching with alkali etching liquid formed of KOH (potassium hydroxide) or the like.

In this case, the anisotropic etching progresses by utilizing the difference between the etching rate in the depth direction of the recess portion 20 and the etching rate of the slant faces, whereby the octagonal diaphragm 30 as shown in FIGS. 6 and 7A–7B is formed.

When miniaturization of the sensor, that is, miniaturization of the monocrystal silicon substrate 10 is aimed in the semiconductor pressure sensor having the octagonal diaphragm 30 as described above, the area of the diaphragm occupying a large area is reduced. If so, it may be considered to reduce the size of the octagonal opening portion of the etching mask.

According to studies of the inventors, however, it has been found that when the opening portion of the etching mask is merely reduced in size under the condition that the thickness of the monocrystal silicon substrate 10 and the thickness of the diaphragm 30 are constant, the shape of the diaphragm 30 becomes a rectangle.

For example, under the condition that the thickness of the monocrystal silicon substrate 10 is set to 300 $\mu$m, the thickness of the diaphragm 30 is set to about 10 to 20 $\mu$m and the longitudinal and lateral dimensions L (see FIG. 7A) are reduced to less than 620 $\mu$m, the shape of the diaphragm 30 becomes rectangular in plan view as shown in FIG. 8A when the above etching method is used. Here, FIG. 8A is a plan view and FIG. 8B is a cross-sectional view taken along a line VIIIB—VIIIB of FIG. 8A.

That is, the etching rate in the depth direction and the etching rate of the slant faces 21 to 24 are settled in the etching process of the recess portion 20. Therefore, as the size of the diaphragm 30 is reduced, the four slant faces 21 to 22 are linked to one another as shown in FIGS. 8A–8B, and thus the shape of the diaphragm 30 becomes rectangular.

When the shape of the diaphragm is varied from the octagonal shape to the rectangular shape as described above, the difference in thermal stress between the center gage and the side gage is larger as compared with the case when the diaphragm 30 has an octagonal shape. FIG. 9 is a diagram showing an analysis result of the magnitude of thermal stress applied to the center gages Rc1, Rc2 and the magnitude of thermal stress applied to the side gages Rs1, Rs2 by using a finite element method (FEM) when the diaphragm 30 has an octagonal shape and when the diaphragm 30 has a rectangular shape.

As is apparent from FIG. 9, the difference between the thermal stress σc applied to the center gages Rc1, Rc2 and the thermal stress σc applied to the side gages Rs1, Rs2 is larger in the case of the rectangular diaphragm 300 than in the case of the octagonal diaphragm 30. Therefore, the TNO characteristic is degraded for a rectangular diaphragm.

SUMMARY OF THE INVENTION

The present invention has been implemented in view of the above problem, and has an object to enable an octagonal diaphragm to be easily manufactured when the diaphragm is miniaturized in a method of manufacturing a semiconductor pressure sensor in which a pressure detecting diaphragm is formed on a monocrystal silicon substrate whose principal surface corresponds to the (110)-face.

In order to attain the above object, according to a first aspect, a method of manufacturing a semiconductor pressure sensor comprises preparing a monocrystal silicon substrate in which the face direction of one face corresponds to the (110)-face, and disposing an etching mask at the one face side of the monocrystal silicon substrate; forming a recess portion on the monocrystal silicon substrate by conducting anisotropic etching from the one face of the monocrystal silicon substrate and also forming a pressure-receiving diaphragm at the bottom surface side of the recess portion in the monocrystal silicon substrate, wherein the etching mask has a cross-shaped opening portion at which a first area extending along the <110> crystal axis direction and a second area extending along the <100> crystal axis direction cross each other, and the area of an opening portion in the overlap area between the first area and the second area in the opening portion is set to be smaller than the area of the diaphragm.

When the etching mask as described above is used and the anisotropic etching for formation of the recess portion progresses, a part of each slant face serving as a side surface of the recess portion appears from the opening portion of the overlap area between the first and second areas in the cross-shaped opening portion to each end portion of the cross-shape.

In addition, during the anisotropic etching, the substrate portion located between the respective neighboring parts of the slant faces appearing from the opening portion of the etching mask is hidden below the etching mask, and thus the etching rate of the substrate portion concerned can be delayed. Therefore, the four slant faces can be prevented from being finally linked to one another and thus the diaphragm can be prevented from becoming rectangular in shape.

As described above, according to the manufacturing method of this invention, during the anisotropic etching for forming the recess portion and the diaphragm, other side surfaces can be left as the side surfaces of the recess portion between the respective neighboring slant faces. Accordingly, according to the present invention, the octagonal diaphragm can be easily implemented when the diaphragm is miniaturized.

According to a second aspect of the present invention, the opening portion of the overlap area between the first area and the second area in the opening portion of the etching mask is designed in an octagonal shape.

According to the second aspect, the diaphragm can be easily designed in an octagonal shape by the anisotropic etching, and this is more preferable.

The reference numerals in parentheses of the respective elements are examples representing the corresponding relationship with the specific elements described in embodiments described later.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

A preferred embodiment according to the present invention will be described hereunder with reference to the accompanying drawings.

Figure 1:
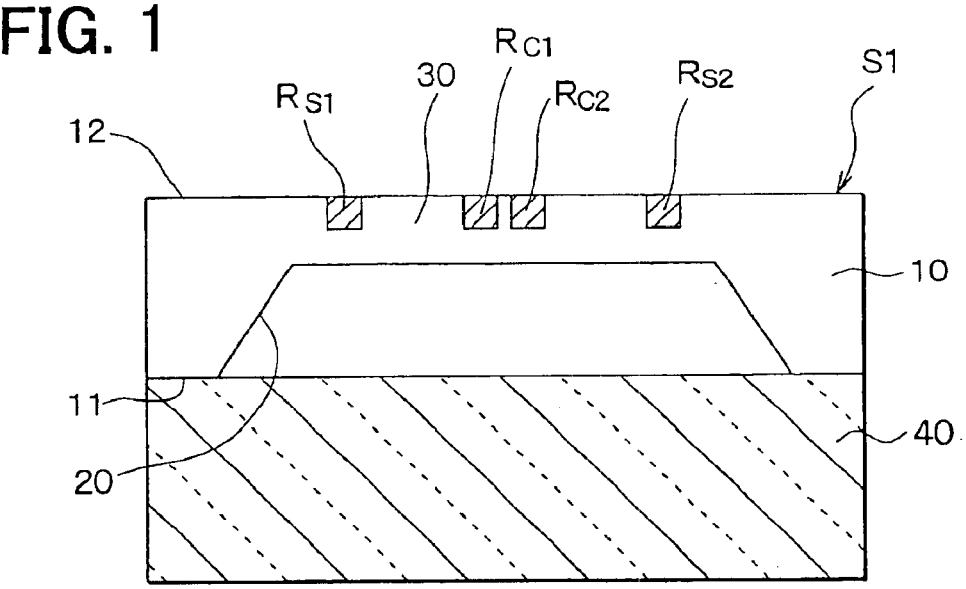
FIG. 1 is a cross-sectional view showing a semiconductor pressure sensor according to a preferred embodiment.
Figure 2:
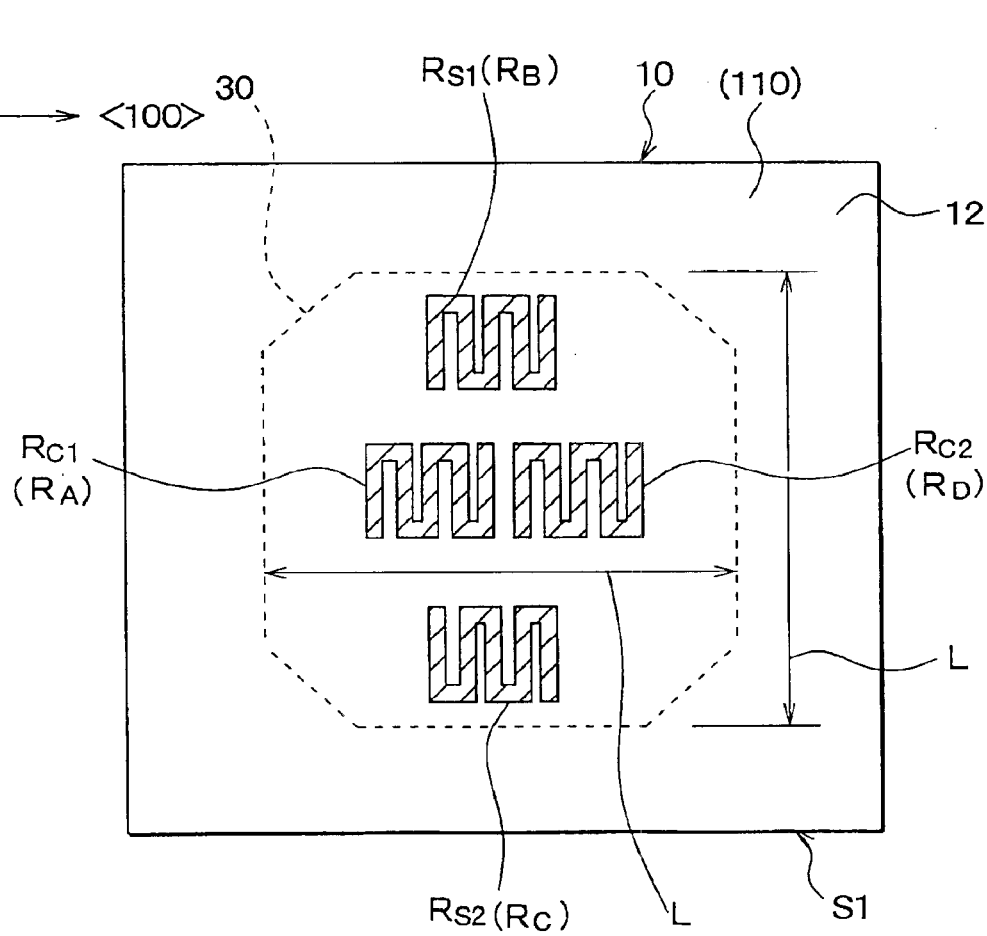
FIG. 2 is a diagram showing a planar shape of a diaphragm formed in a monocrystal silicon substrate of the sensor shown in FIG. 1.

FIG. 1 is a cross-sectional view showing a semiconductor pressure sensor S1 according to an embodiment of the present invention, and FIG. 2 is a plan view taken from the upper side which shows the planar shape of a diaphragm 30 formed in a monocrystal silicon substrate 10 of the sensor S1.

Figure 3:
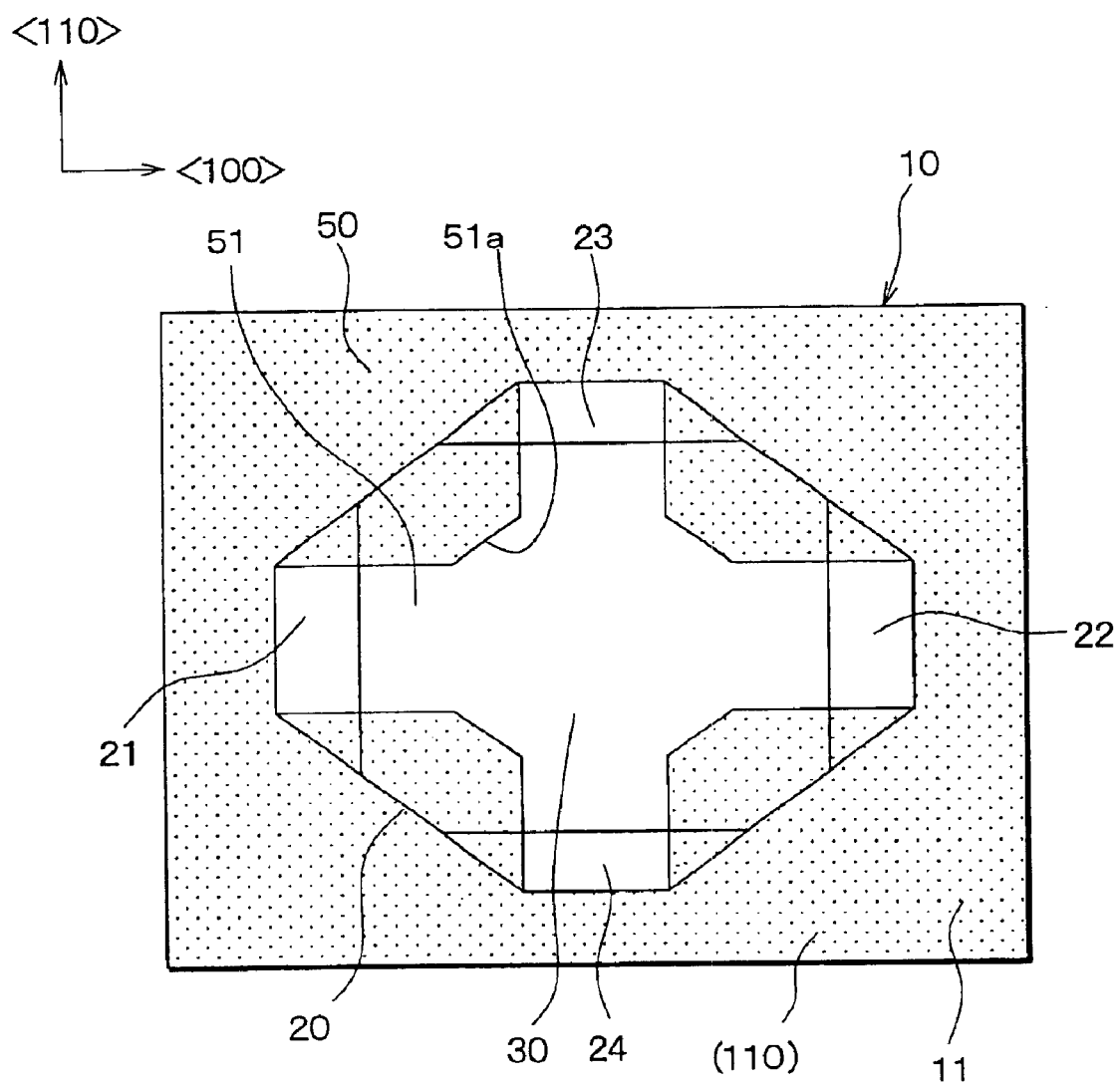
FIG. 3 is a plan view showing a diaphragm and a recess portion when viewed from one face of the monocrystal silicon substrate of the sensor shown in FIG. 1.
Figure 4:
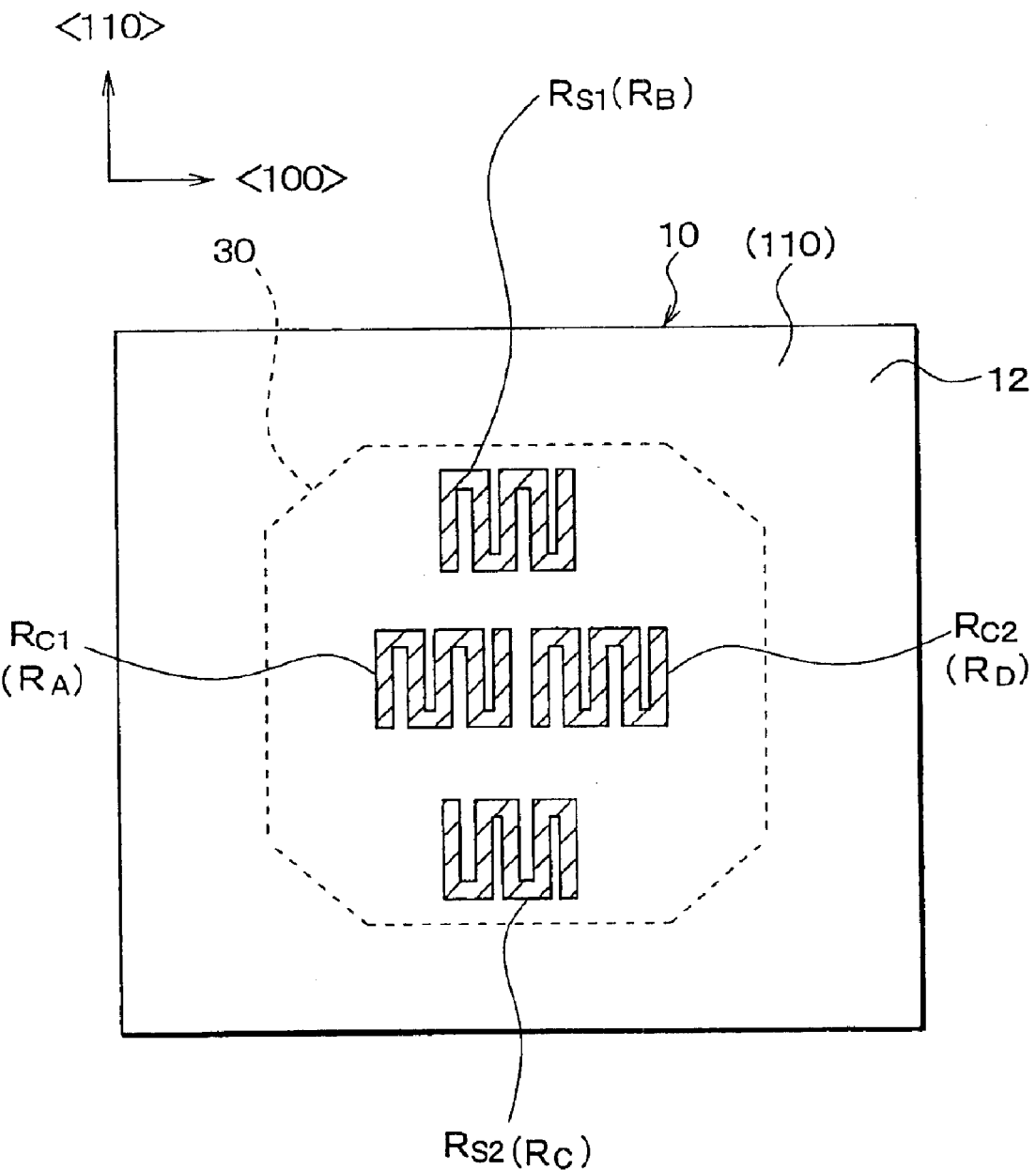
FIG. 4 is a related art diagram showing an arrangement state of strain gage resistors on the diaphragm of the semiconductor pressure sensor using a monocrystal silicon substrate whose principal surface corresponds to the (110)-face.

FIG. 3 is a plan view of the diaphragm 30 and a recess portion 20 when viewed from one face 11 of the monocrystal silicon substrate 10, and it also shows an etching mask 50. In FIG. 2, the outlook of the diaphragm 30 is represented by a broken line, and dot-hatching is applied to the etching mask 50 for the sake of convenience in FIG. 3.

The face-direction of the principal surface of the monocrystal silicon substrate 10 corresponds to the (110)-face. That is, one face (lower surface in FIG. 1) 11 and another surface (upper surface in FIG. 1) 12 of the monocrystal silicon substrate 10 correspond to the (110)-face.

A recess portion 20 recessed from the one face 11 of the monocrystal silicon substrate 10 is formed in the monocrystal silicon substrate 10. A pressure-receiving diaphragm 30 having an octagonal shape in plan view is formed at the bottom surface side of the recess portion 20 at which the thickness is reduced in connection with the formation of the recess portion 20.

Here, when the thickness of the monocrystal silicon substrate 10 is set to about 300 $\mu$m, the depth of the recess portion 20 is equal to about 280 to 295 $\mu$m. That is, the thickness of the diaphragm 30 is equal to about 5 to 20 $\mu$m. Furthermore, the longitudinal and lateral dimensions L (see FIG. 2) of the diaphragm 30 are reduced to less than 620 $\mu$m.

Figure 6:
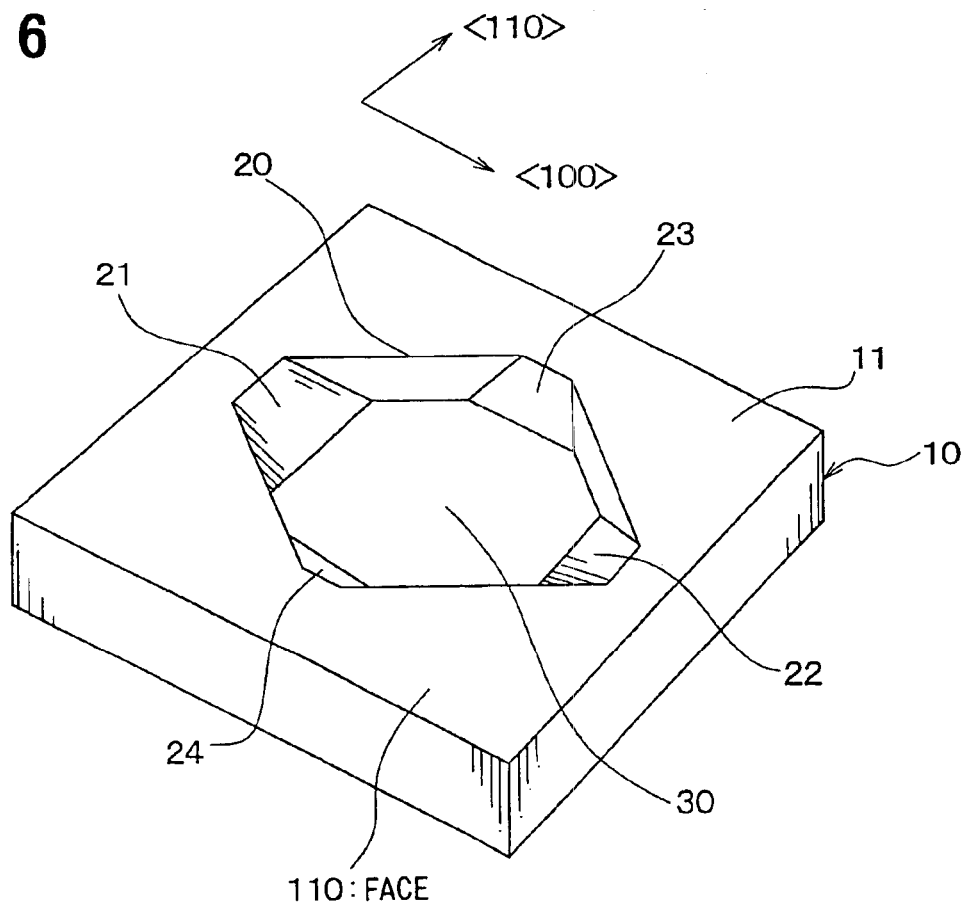
FIG. 6 is a perspective view showing the shape of the diaphragm when viewed from the one face side of the monocrystal silicon substrate of a semiconductor pressure sensor.
Figure 7A:
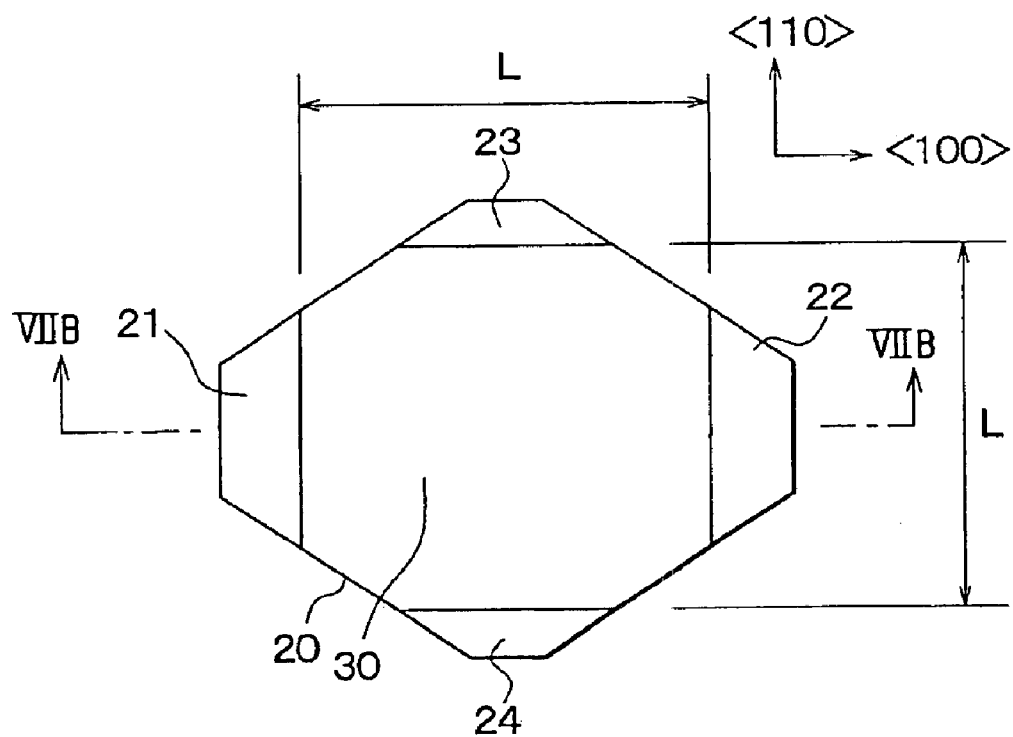
FIG. 7A is a plan view showing the diaphragm shown in FIG. 6.
Figure 7B:
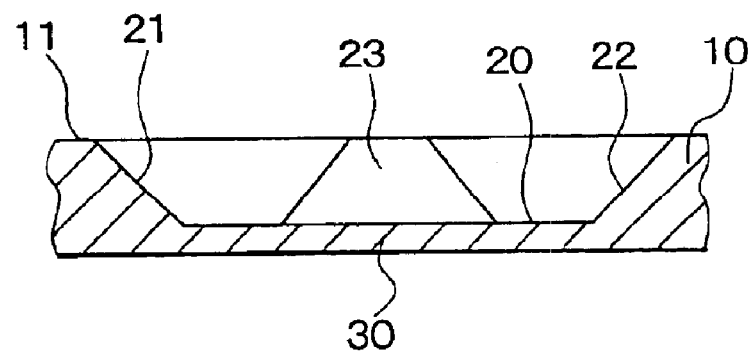
FIG. 7B is a cross-sectional view taken along a line VIIB—VIIB of FIG. 7A.
Figure 8A:
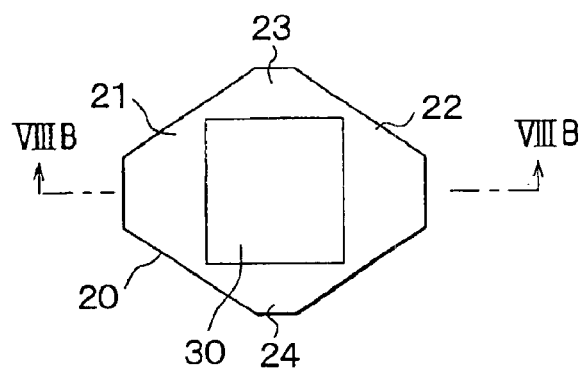
FIG. 8A is a plan view showing a related art diaphragm having a rectangular shape in plan view in a semiconductor pressure sensor using a monocrystal silicon substrate whose principal surface corresponds to the (110)-face.
Figure 8B:
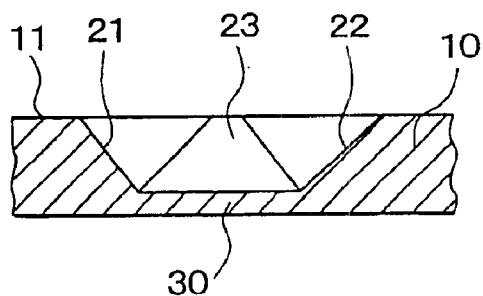
FIG. 8B is a cross-sectional view taken along a line VIIIB—VIIIB of FIG. 8A.
Figure 9:
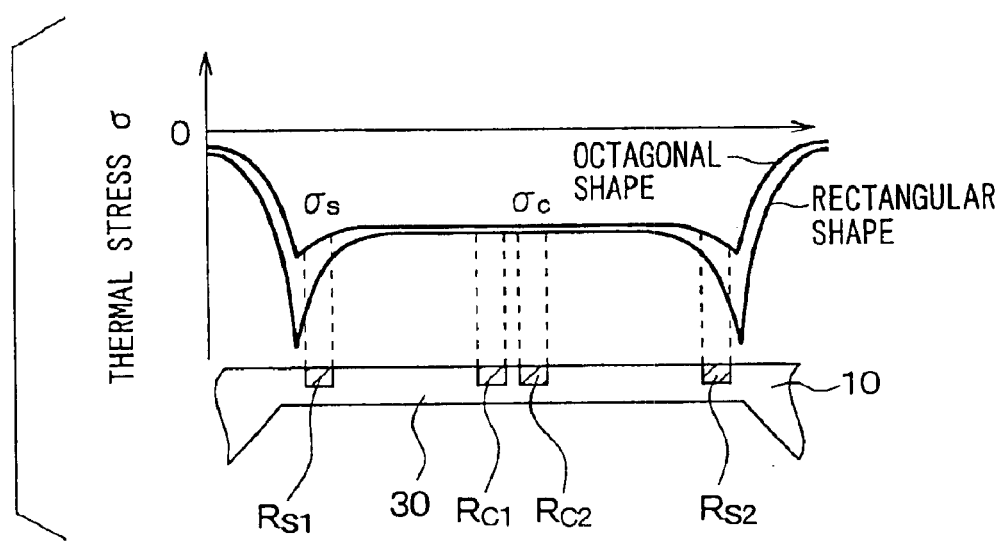
FIG. 9 is a diagram showing an analysis result of the magnitude of thermal stresses applied to center gages and side gages which is achieved by using a finite element method (FEM) when the diaphragm is designed in an octagonal shape and in an rectangular shape in the semiconductor pressure sensor using the monocrystal silicon substrate whose principal surface corresponds to the (110)-face.

Similarly to as shown in FIGS. 6 and 7B, the opening portion of the recess portion 20 formed in the monocrystal silicon substrate has an octagonal shape. As shown in FIG. 3, four slant faces 21, 22, 23, 24 and vertical faces each of which is located between the respective neighboring slant faces are formed as side surfaces from the octagonal opening portion in the recess portion 20, and the bottom surface of the recess portion 20 is constructed as the octagonal diaphragm 30 through these side surfaces.

Here, with respect to the side surfaces of the recess portion 20, a pair of slant faces 21, 22 confronted to each other along the <100> crystal axis correspond to the (111)-face, and a pair of slant faces 23, 24 confronted to each other along the <110> crystal axis correspond to the (110)-face.

As shown in FIGS. 1 and 2, strain gage resistors Rc1, Rc2, Rs1, Rs2 constituting a bridge circuit for outputting a detection signal in connection with strain of the diaphragm 30 are formed on the other surface 12 of the monocrystal silicon substrate 10. The strain gage resistors Rc1, Rc2, Rs1, Rs2 are diffused gage resistors formed by doping, diffusion or the like.

The strain gage resistors Rc1 Rc2, Rs1, Rs2 are arranged so that the longitudinal direction of each resistor corresponds to the <110> crystal axis direction, and comprise a pair of center gages Rc1, Rc2 disposed at the center portion of the diaphragm 30 and a pair of side gages Rs1, Rs2 disposed to be nearer to the peripheral portion of the diaphragm 30 than the center gages Rc1, Rc2.

Figure 5:
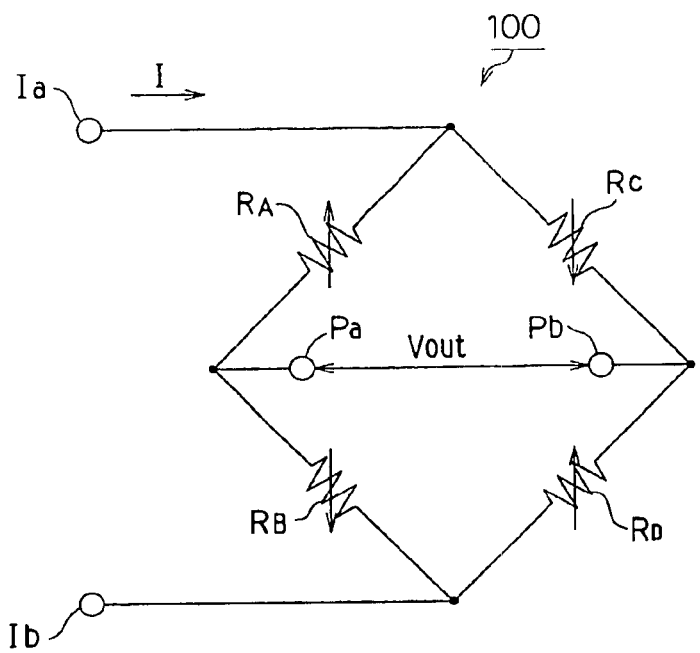
FIG. 5 is a connection diagram showing a bridge circuit constructed by the strain gage resistors.

The four strain gage resistors Rc1, Rc2, Rs1, Rs2 constitute a bridge circuit 100 as shown in FIG. 5 and detect stress occurring in the <110> crystal axis direction while the resistance value of the center gage Rc1 is set to RA, the resistance value of the center gage Rc2 is set to RD, the resistance value of the side gage Rs1 is set to RB and the resistance value of the side gage Rs2 is set to RA.

That is, in the semiconductor pressure sensor S1 according to this embodiment, these strain gage resistors Rc1, Rc2, Rs1, Rs2 are connected to one another in series to form a rectangular closed circuit, thereby forming a Wheatstone bridge circuit.

The strain of the diaphragm 30 appears as variation of the resistance values of the strain gage resistors RA, RB, RC, RD under the state that a DC constant current I is applied from an input terminal Ia to Ib in the bridge circuit 100 shown in FIG. 5, and a voltage (detection signal) having the level corresponding to the detected pressure, that is, midpoint potential Vout is output between the output terminals Pa and Pb.

Furthermore, as shown in FIG. 1, the semiconductor pressure sensor S1 is bonded to a glass seat 40 at the one face of the monocrystal silicon substrate 10 by anode bonding or the like. In this embodiment, the inside of the recess portion 20 is hermetically sealed by the glass seat 40 to be set as a reference pressure chamber, thereby an absolute pressure type pressure sensor.

As not shown, the semiconductor pressure sensor may be designed so that a pressure introducing passage for making the recess portion 20 intercommunicate with the external is formed. Pressure to be measured is introduced from the pressure introducing passage into the recess portion 20 so that the pressure is received by the back side of the diaphragm 30.

The semiconductor pressure sensor S1 can be formed as follows.

First, a monocrystal substrate 10 in which the face-direction of the principal surface, that is, one face 11 and another face 12 corresponds to the (110)-face is prepared. Strain gage resistors Rc1, Rc2, Rs1, Rs2, various kinds of wires, etc. are formed on the other face of the monocrystal silicon substrate 10 by using a semiconductor manufacturing technique such as ion doping, diffusion or the like.

Thereafter, an etching mask 50 having a cross-shaped opening portion 51 as shown in FIG. 3 is formed on the one face 11 of the monocrystal silicon substrate 10. The etching mask 50 is formed of silicon nitride film or the like formed by CVD or the like.

The opening portion 51 of the etching mask 50 has a cross-shape, and specifically it is designed to have such a cross-shape that the first area extending along the <110> crystal axis direction and the second area extending along the <100> crystal axis direction cross each other.

Here, as shown in FIG. 3, each of the first area and the second area is a slender rectangular opening portion extending along the corresponding crystal axis, and these two slender opening portions cross each other to thereby form the cross-shaped opening portion 51 of the etching mask 50.

As is apparent from FIG. 3, the planar shape of the opening portion 51a of the overlap area between the first and second areas in the opening portion 51 of the etching mask 50 is octagonal in this embodiment. In other words, the opening portion 51 of the etching mask 50 is designed to have a cross-shape having an opening area extending along the <110> crystal axis direction and an opening area extending along the <100> crystal axis direction with the octagonal opening portion 51a located at the center.

As shown in FIG. 3, the area of the opening portion 51a of the overlap area between the first and second areas is set to be smaller than the area of the diaphragm 30 to be formed.

The planar shape of the opening portion 51a of the overlap area between the first and second areas may be a rectangle which is inclined to the <110> crystal axis and the <100> crystal axis and has no side.

After the etching mask 50 is formed at the one-face 11 side of the monocrystal silicon substrate 10 as described above, the anisotropic etching is conducted from the one face 11 of the monocrystal silicon substrate 10 to form the recess portion 20 in the silicon substrate 10, and also form the diaphragm 30 at the bottom surface side of the recess portion 20 in the monocrystal silicon substrate 10.

A well-known method using alkali etching liquid or the like may be used for the anisotropic etching. Etching liquid using KOH (potassium hydroxide), TMAH (Tetramethyl ammonium halide) or the like may be used as the alkali etching liquid.

In the anisotropic etching step as described above, the anisotropic etching progresses by utilizing the difference between the etching rate in the depth direction of the recess portion 20 and the etching rate of the slant faces.

In this case, when the anisotropic etching progresses with the cross-shaped etching mask 50 described above, a part of each of the slant faces 21 to 24 as the side surfaces of the recess portion 20 appears from the opening portion 51a of the overlap area between the first and second areas in the cross-shaped opening portion 51 to each end portion of the cross-shape.

During the anisotropic etching step, the substrate portion located between the respective neighboring parts of the slant faces 21 to 24 appearing from the opening portion 51 of the etching mask 50 is hidden below the etching mask 50, and thus the etching rate of the substrate portion concerned can be delayed.

Therefore, the four slant faces 21 to 24 can be prevented from being finally linked to one another and thus the diaphragm 30 can be prevented from becoming rectangular in shape.

As described above, according to the manufacturing method of this invention, in the anisotropic etching step of forming the recess portion 20 and the diaphragm 30, other side surfaces can be left as the side surfaces of the recess portion 20 between the respective neighboring slant faces 21 to 24, and thus the diaphragm 30 has an octagonal shape. Through the above process, the semiconductor pressure sensor S1 having the octagonal diaphragm 30 is completed.

Thereafter, the semiconductor pressure sensor S1 is bonded to the glass seat 40 by a node bonding or the like after the etching mask 50 is removed by etching or the like.

As described above, according to this embodiment, the manufacturing method with which the octagonal diaphragm 30 can be easily implemented when the diaphragm 30 is miniaturized can be provided. In addition, there can also be provided the semiconductor pressure sensor S1 having a small difference between the thermal stress applied to the side gages Rs1, Rs2 and the thermal stress applied to the center gages Rc1, Rc2 and also an excellent TNO characteristic even when the diaphragm 30 is miniaturized.

Furthermore, according to this embodiment, the planar shape of the opening portion 51a of the overlap area between the first and second areas in the opening portion 51 of the etching mask 50 is an octagonal shape having sides slanting with respect to the <110> crystal axis direction and the <100> crystal axis direction. The faces other than the slant faces 21 to 24 in the side surfaces of the recess portion 20 which surround the octagonal diaphragm 30 contain various faces having various face-directions.

In this point, by designing the opening portion 51a of the overlap area in an octagonal shape which is geometrically similar to the shape of the diaphragm 30, the faces having various face-directions can be smoothly formed in clear shapes when the anisotropic etching is carried out. That is, the diaphragm 30 can be more easily designed in an octagonal shape by the anisotropic etching.

In the above embodiment, the etching mask 51 is designed to have a cross-shaped opening portion 51a. However, the shape of the opening portion 51a of the etching mask 51 is not limited to the cross-shape. Any shape may be adopted insofar as the diaphragm 30 can be designed in an octagonal shape. For example, the octagonal shape of the opening portion of an etching mask may be modified so that the etching mask portion (dot-hatched portion in FIG. 3) is extended toward the center of the opening portion thereof in the <111> crystal axis direction as shown in FIG. 3. That is, the etching mask may be designed so as to extend to the center of the octagonal opening portion thereof at four sides out of the eight sides defining the octagonal opening portion of the etching mask, the respective two sides of the four sides concerned being diagonally confronted to each other. The respective two sides may be located to confront each other in the <111> crystal axis direction.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of manufacturing a semiconductor pressure sensor on a monocrystal silicon substrate in which the face direction of one face corresponds to the (110)-face, the method comprising:

disposing an etching mask at the one face side of the monocrystal silicon substrate, wherein the etching mask has a cross-shaped opening portion at which a first area extending along the <110> crystal axis direction and a second area extending along the <100> crystal axis direction cross each other, and an area of an opening portion in an overlap area between the first area and the second area in the opening portion is set to be smaller than an area of a diaphragm to be formed in the substrate; and forming a recess portion on the monocrystal silicon substrate by conducting anisotropic etching from the one face of the monocrystal silicon substrate and also forming a pressure-receiving diaphragm at the bottom surface side of the recess portion in the monocrystal silicon substrate.

2. The semiconductor pressure sensor manufacturing method according to claim 1, wherein the opening portion of the overlap area between the first area and the second area in the opening portion of the etching mask is in an octagonal shape.

3. A method for manufacturing a semiconductor pressure sensor on a monocrystal semiconductor substrate, the method comprising:

disposing an etching mask on a face side of the monocrystal semiconductor substrate corresponding to the (110)-face, wherein the etching mask comprises an opening portion comprised of a first area extending along the <II0> crystal axis, a second area extending along the <100> crystal axis and an overlap portion between the first and second areas inclined to the <110> crystal axis and the <100> axis; and forming a recess portion on the monocrystal silicon substrate by conducting anisotropic etching from the one face side of the monocrystal silicon substrate and also forming a pressure-receiving diaphragm at a bottom surface side of the recess portion in the monocrystal silicon substrate.

4. A method of manufacturing a semiconductor pressure sensor on a monocrystal silicon substrate in which the face direction of one face corresponds to the (110) -face, method comprising:

disposing an etching mask at the one face side of the monocrystal silicon substrate, the etching mask having:

an opening portion including a first area extending along the <110> crystal axis direction and a second area extending along the <100> crystal axis direction, the first area and the second area crossing each other such that the opening portion has a cross shape, and an overlap area including an opening where the first area and the second area of the opening portion overlap, the opening set to be smaller than an area of a diaphragm to be formed in the substrate; and forming a recess portion on the monocrystal silicon substrate by conducting anisotropic etching from the one face of the monocrystal silicon substrate and also forming a pressure-receiving diaphragm at the bottom surface side of the recess portion in the monocrystal silicon substrate.

5. The semiconductor pressure sensor manufacturing method according to claim 4, wherein the opening of the overlap area includes an octagonal shape.

* * * * *